Dec. 28, 1926.

L. S. MARKS 1,612,596

AUTOMATIC CONTROL FOR OIL BURNERS

Filed Jan. 19, 1923

Inventor
Lionel S. Marks

By William R. Pratt

Attorney

Patented Dec. 28, 1926.

1,612,596

UNITED STATES PATENT OFFICE.

LIONEL S. MARKS, OF CAMBRIDGE, MASSACHUSETTS, ASSIGNOR TO PEABODY ENGINEERING CORPORATION, A CORPORATION OF NEW YORK.

AUTOMATIC CONTROL FOR OIL BURNERS.

Application filed January 19, 1923. Serial No. 613,692.

My invention relates to a method of automatically controlling combustion of liquid or other fuel injected into a furnace and mixed with the proper amount of air for combustion, more particularly to the use of oil fuel injected into a boiler furnace by means of mechanical atomizers of the type which are controlled over a wide range in capacity by returning a portion of the oil through a return manifold which may be fitted with one control valve, and has for its object the production of a simple and sensitive automatic control which regulates the amount of oil burned through the use of variations in steam pressure and at the same time controls the damper or air regulator by the pressure in the by-pass line or return manifold.

During all periods of change of fuel supply, either increase or decrease, an adequate air supply should be maintained so as to ensure good combustion and the absence of smoke. One of the objects of my invention is to produce a system of control that will accomplish this fact.

The foregoing and other features of my invention will now be described in connection with the accompanying drawing in which I have diagrammatically shown a preferred embodiment after which I shall point out in the claims those features which I believe to be new and of my own invention.

In the drawings:—

Figure 1:
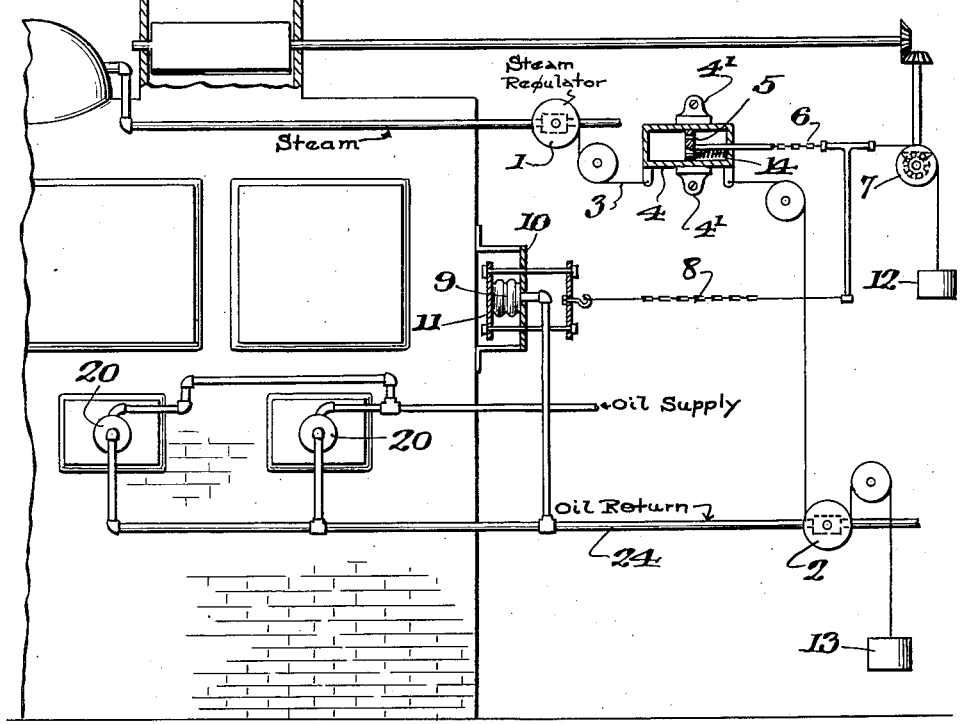
Figure 1 is a diagrammatical view of my control system.

In the diagram, Figure 1, I indicate a Mason regulator 1 or similar device which controls the by-pass valve 2 and thereby controls the fuel supply. This valve is in the return manifold 24 of a mechanical atomizer 20 or group of atomizers. When the valve 2 is shut off the atomizer 20 will act as a straight mechanical atomizer, and as the valve 2 is opened a regulable amount of oil is by-passed the atomizer tip thereby reducing the oil entering into the combustion chamber, all of which is common to the Peabody-Fisher burners and system of control and therefore requires no further description here.

Attached to the connection 3 interposed between the regulator 1 and the by-pass valve 2 is a dash pot cylinder 4 slidably mounted in guides 4'. The piston 5 connects through a flexible connection 6, with the boiler damper or air control device 7. To the connection 6 is attached another flexible connection or chain 8 which connects with the air control apparatus 9. An expansion spring 14 tends to move the piston 5 toward the left in the dash pot 4.

In the preferred form this apparatus would be a sylphon or metal bellows with by-pass pressure inside. This pressure is the same as the pressure of the oil in the return manifold and as the pressure increases the sylphon will expand. One end is held stationary as at 10 and the opposite end 11 is connected through the flexible connection 8 to the boiler damper control device 7.

The action of this apparatus is as follows:—With decrease of steam pressure the regulator 1 rotates contra-clockwise, closing the by-pass valve 2 and moving the dash pot 4 to the left, at the same time carrying with it the dash pot piston and thereby opening the damper through the control device 7. The chain 8 becomes slack. The weight 12 exerts a constant force on the dash pot piston and moves it to the right tending at the same time to straighten out the flexible connection or chain 8. The damper control 7 finally finds its correct position under the action of the air control apparatus 9, due to the expansion of the sylphon under increasing pressure in the by-pass line.

With the increase of steam pressure the regulator 1 turns clockwise, the dash pot 4 is drawn to the right by the action of the weights 13 and chain 6 becomes slack. The damper control 7 consequently remains for the time being unchanged while the fuel amount is cut down, then as the by-pass pressure diminishes in sylphon or metal bellows 9 the weight 12 will close the air damper.

Figure 2:
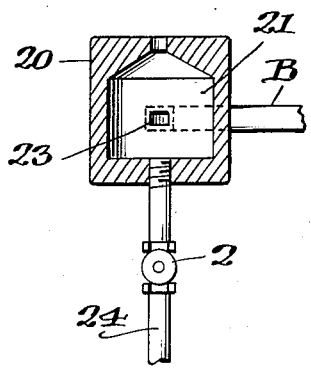
Figure 2 is a diagrammatical section of an atomizer to which my control may be applied.

Referring particularly to Figure 2 in which I have shown diagrammatically an atomizer to which my control may be applied, 20 represents an atomizer tip, 21 a whirling or central chamber into which the oil supply 22 is lead tangentially as at 23. A return or by-pass line 24 is provided with the valve 2.

It will be readily understood that by placing on the damper spindle a cam in place of the usual straight lever, it would be possible to adjust my apparatus in such a way as to maintain any desired flue gas composition.

It will be apparent from the above description that I have provided a control in which a temporary excess air supply is furnished simultaneously with an increase of oil supply and that when the steam pressure goes down, the by-pass pressure is increased furnishing more oil to the burner. More oil to the burner means that the by-pass is closed and the by-pass pressure increasing furnishes more air. In other words the position of the damper is regulable by the by-pass pressure.

It will be further apparent that with an increase of steam pressure the oil supply to the atomizer 20 will decrease but the consequent diminution in the air supply is made to lag so that an adequate supply of air is ensured during the period of change.

I wish it distinctly understood that my system of control may be adaptable to a straight mechanical atomizer without a return or by-pass line by connecting the air control apparatus in the oil supply line so that the pressure of the oil supply will operate it to regulate the air. While this will not give the wide range of control that my system applies to the Fisher-Peabody burners will, it is nevertheless within the scope of my invention and I therefore intend the following claims to cover such modifications.

I claim:

1. An oil burning apparatus comprising an atomizer, means for delivering oil under pressure to said atomizer and giving said oil a rotary motion, means for returning a portion of said oil after imparting to it said rotary motion, means for regulating the amount of oil returned, means for providing air for combustion and means for regulating amount of said air by the pressure of the oil returned.

2. A device as recited in claim 1 in which an excess supply of air is delivered during the period of increase in amount of oil atomized.

3. A device as recited in claim 1 with the addition of means for providing for an excess supply of air during the period of decrease in amount of oil atomized.

4. A device as recited in claim 1 with the addition of means for providing for an excess supply of air during the period of increase in amount of oil atomized, and means for providing for an excess supply of air during the period of decrease in amount of oil atomized.

5. A method of controlling the combustion of fuel in a boiler furnace which comprises delivering fuel under pressure to an atomizer, imparting rotary motion to the fuel returning a regulable amount of fuel after imparting a rotary motion thereto, controlling the amount of fuel returned by the variation in steam pressure in the boiler, supplying air for combustion and controlling the amount of air supplied by the pressure of the fuel returned.

6. A method for controlling the combustion of fuel in a furnace which comprises delivering fuel under a uniform pressure to the point of combustion imparting a whirling motion thereto, returning a portion of the whirling fuel, controlling the amount of fuel returned in accordance with the variation in steam pressure, controlling the air supply by the pressure of the fuel returned, and providing an excess of air during the period of change from any working condition to another.

7. A method of producing heat by burning liquid fuel comprising the delivery of the fuel to an atomizer imparting a rotary motion to the fuel, providing air for combustion, controlling the amount of fuel atomized by returning from the atomizer a regulable portion of the liquid after imparting a rotary motion thereto, regulating the amount returned to control the amount of heat produced and regulating the amount of air by the pressure of fuel returned from the atomizer.

In testimony whereof I affix my signature.

LIONEL S. MARKS.